United States Patent [19]

Marcus

[11] Patent Number: 5,573,791
[45] Date of Patent: Nov. 12, 1996

[54] APPARATUS FOR FORMING A PARISON HAVING MULTIPLE RESIN LAYERS

[76] Inventor: Paul Marcus, 6 Bayberry Dr., Saddle River, N.J. 07458

[21] Appl. No.: 518,618

[22] Filed: Aug. 23, 1995

Related U.S. Application Data

[62] Division of Ser. No. 322,436, Oct. 13, 1994.

[51] Int. Cl.⁶ ................................................. B29C 49/22
[52] U.S. Cl. .......................... 425/523; 264/513; 264/537; 425/526; 425/533; 425/534; 425/537; 425/547; 425/556; 425/588
[58] Field of Search ............................... 425/533, 534, 425/523, 526, 529, 537, 574, 588, 547, 556; 264/513, 537

[56] References Cited

U.S. PATENT DOCUMENTS

| | | | |
|---|---|---|---|
| 3,480,994 | 12/1969 | Moslo | 425/533 X |
| 3,878,282 | 4/1975 | Bonis et al. | 264/237 X |
| 4,061,705 | 12/1977 | Marcus | 425/549 X |
| 4,285,657 | 8/1981 | Ryder | 425/533 X |
| 4,321,029 | 3/1982 | Aoki | 425/533 X |
| 4,376,090 | 3/1983 | Marcus | 264/530 |
| 4,405,556 | 9/1983 | Valyi | 425/523 X |
| 4,571,171 | 2/1986 | Blank et al. | 425/533 |
| 4,604,258 | 8/1986 | Valyi | 425/537 X |
| 4,950,152 | 8/1990 | Brun, Jr. et al. | 425/534 X |
| 5,501,589 | 3/1996 | Marcus | 425/526 |

FOREIGN PATENT DOCUMENTS

56-166027  12/1981  Japan ...................... 264/513

*Primary Examiner*—Richard L. Chiesa
*Attorney, Agent, or Firm*—Kane, Dalsimer, Sullivan, Kurucz, Levy, Eisele and Richard, LLP

[57] ABSTRACT

An apparatus forms multiple resin layered parisons that are cooled or blown into bottles. The individual resin layers are injection molded in sequence and the formed parisons are transferred to each cooling and molding station by an axially and laterally indexing platen.

27 Claims, 6 Drawing Sheets

APPARATUS FOR FORMING A PARISON HAVING MULTIPLE RESIN LAYERS

This is a division of copending application Ser. No. 08/322,436, filed Oct. 13, 1994.

BACKGROUND OF THE INVENTION

It is recognized in the parison molding art that sufficient cooling of parisons is indispensable if the parisons are to maintain their shape upon withdrawing or pulling out of the core rod deployed at the injection molding station and during later handling operations. A high rate of production of parisons is important in commercial operation, and the rate at which the injection molding cycle can produce the parisons has been limited by the time taken to cool the parisons sufficiently to allow post molding handling without damage to the parison.

Typically, the hollow plastic parisons produced in the injection molding cycle have relatively thick walls and are molded with PET resin at relatively high temperatures. Consequently, prior to removal from the injection mold, the hollow parison must be cooled sufficiently to prevent deformation during removal and during transit and must be cooled to glass transition temperatures so as to reduce crystalization and allow orientation. However, the thick parison wall tends to trap heat. Cooling the parison in the injection mold by means of its contact with the cool mold and core rod surfaces quickly chills the inner and outer skin, but mold cooling will remove the heat trapped within the parison wall only by keeping the parison in the injection mold for an extended period of time. Naturally, this is economically prohibitive because high parison production and ultimately bottle protection is not feasible unless cooling of the parison in the injection mold is held at a minimum.

Moreover, there are many applications for parisons possessing multiple layers of resin to form multiple layered packages, bottles or other hollow objects. For example, one or more of the layers could add barrier properties to parisons of polyethylene terapthalate (PET) and the ultimately molded bottles. The inner layer could be virgin PET and the center or outer layer could be recycled post consumer usage material with a third layer being a barrier-type resin. Even with the formation of multiple resin layered parisons, the rate at which parisons are produced is limited by the time taken to cool the parisons sufficiently to allow handling after each layer is injection molded without damage to the parison.

SUMMARY OF THE INVENTION

A principal object of the present invention is to provide an apparatus and procedure for forming a parison from multiple relatively thin layers of resin injected at a series of injection molding stations so that each layer can be cooled within a relatively short period of time thereby decreasing to a minimum injection molding cycle time thereby optimizing production rates.

Another object is to provide an apparatus and procedure of the foregoing type in which each layer may be of the same resin, different resins or with one or more layers possessing barrier properties or one or more layers being virgin resin or one or more layers being recycled post consumer resin.

DETAILED DESCRIPTION OF THE PREFERRED EMBODIMENTS

In the drawings, a multilayered parison injection molding machine 10 is illustrated with a number of in-line stations, namely, an initial single parison injection molding station 12, a pair of second injection molding stations 14a and 14b on opposite sides of the initial single molding station 12, a pair of third injection molding stations 16a and 16b on opposite sides of the respective molding stations 14a and 14b, a pair of parison cooling stations 18a and 18b on opposite sides of the respective molding station 16a and 16b, and a pair of ejection stations 20a and 20b on opposite sides of the respective cooling stations 18a and 18b. As will be readily apparent, one or more additional cooling stations may be interposed between stations 18a, 18b and 20a, 20b to increase the cooling time of the multi-layered parisons while maintaining the molding cycle constant and at a minimum time wise. In this regard, reference is made to patent application Ser. No. 08/282,530 filed Jul. 28, 1994 and entitled "Parison Molding Apparatus and Method". Alternatively, the machine 10 could be an injection blow molding machine in which the cooling stations 18a and 18b could be orient-stretch blow molding stations of the type disclosed in patent application Ser. No. 08/309,103 filed Sep. 20, 1994, now U.S. Pat. No. 5,501,589 and entitled "Injection Blow Molding Apparatus and Method"; and as disclosed in that application, a pre-cure station may also be incorporated prior to blow molding. The apparatus 10 includes a stationary platen 22, and a movable clamping platen 24 shiftable axially and laterally.

The initial parison molding station 12 includes a parison mold 26 mounted on platen 22 and that cooperates with a pair of core rod assemblies 28a and 28b mounted on axially and laterally shiftable clamping and indexing platen 24 in forming a thin walled or layered parison. In each molding cycle, one of the core rod assemblies 28a and 28b is disposed within the cavity of mold 26 for purposes of receiving the injected plastic shot. In accordance with this invention, this cavity will be thinner than normal to produce a parison of reduced thickness for relatively quick cooling. The core rod assemblies 28a and 28b include core rods 30a and 30b and associated split neck molds 32a and 32b. The mold 26, core rods 30a and 30b and neck molds 32a and 32b are temperature controlled and preferably cooled in a manner well known in the art by fluid (air, water or oil). For certain types of containers, a one piece neck mold could be employed. The choice of neck molds depends on the size and shape of containers or bottles being formed. The selected neck mold will remain in a closed position except at such time as it is desired to disassociate the core rod assemblies 28a and 28b from the parison so that the free core rod assembly may be in a position to return to the parison injection molding station 12 to form another thin single wall parison.

Figure 1:
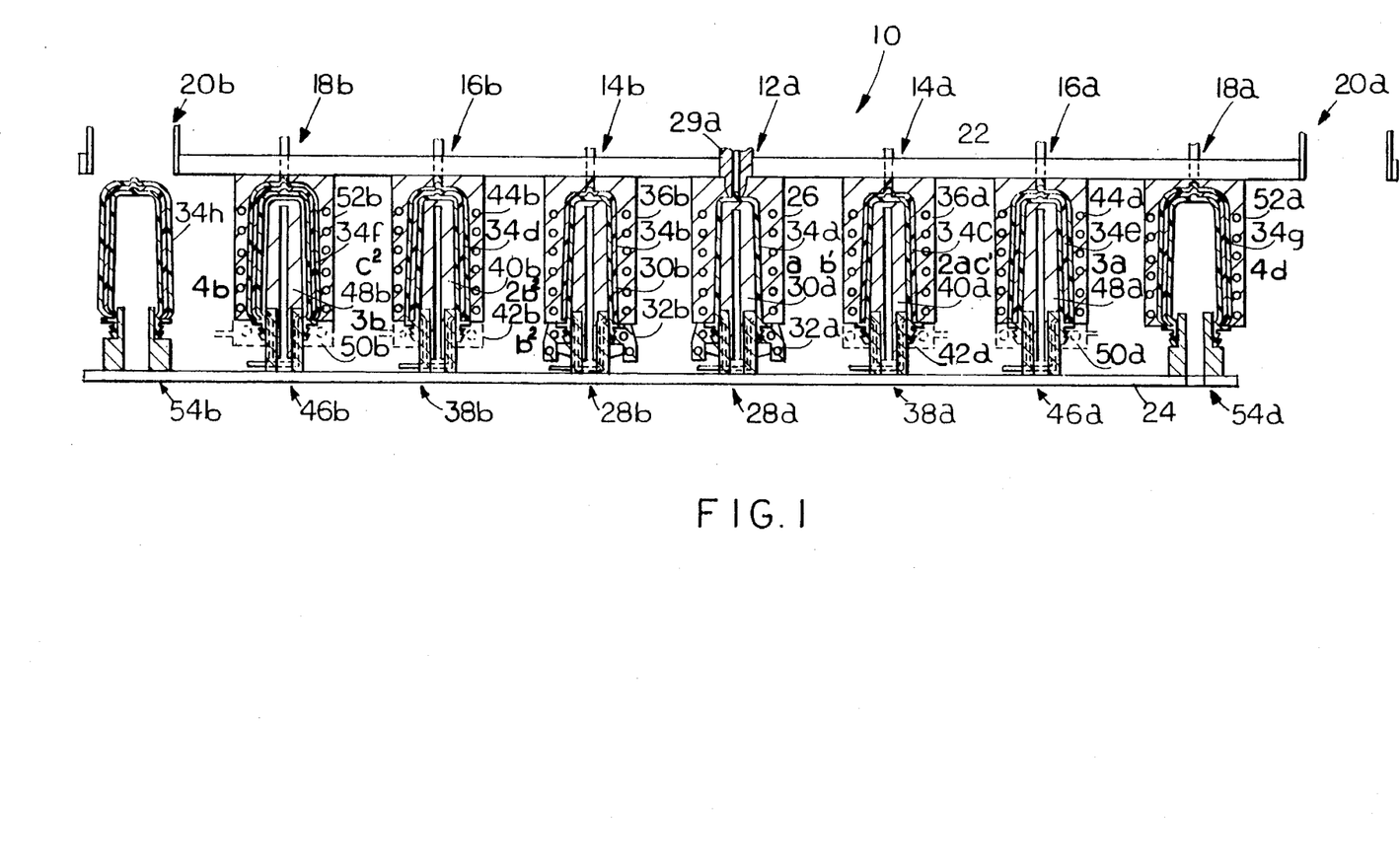
FIG. 1 is a sectional top plan view of an injection molding apparatus of this invention showing the simultaneous formation of a parison with a single layer of resin, a parison with two resin layers, a parison with three resin layers; a previously formed three layered parison being cooled all within a press in a closed or clamped position.

Upon reciprocation of the indexing platen 24 and assuming the relative position of the parts as shown in FIG. 1, the first parison layer injection mold 26 will be disposed about the core rod 30a and into engagement with the closed neck mold 32a also disposed about the core rod 30a to define the first parison layer forming cavity. The first parison layer 34a is formed upon the injection through nozzle 29a into the cavity at the first parison layer injection molding station 12 of the selected plastic under controlled pressure and temperature and with uniform density in a manner well known in the art.

As previously stated, the mold 26 is temperature controlled and preferably cooled by fluid (water or oil) in a manner well known in the art. The neck mold 32a is also cooled by fluid to set the configuration of the neck of the parison. The core rod 30a is similarly cooled by fluid. In this manner, a skin is formed on the outer and inner surfaces of the parison layer 34a and the parison neck. The cooling cycle time at the first parison layer injection station 12 is held to a minimum to optimize the production of parisons.

At the relative disposition of the indexing platen 24 as shown in FIG. 1, a previously molded two layered parison 34c at the second parison layer injection molding station 14a will have been disassociated earlier from the first core rod assembly 28a and neck mold 32a. At the second parison layer injection molding station 14a, two layered parisons 34c will continue to be cooled in the second parison layer injection mold 36a while associated with third core rod assembly 38a on indexing platen 24 and which can also be cooled by fluid (water or oil). Core rod assembly 38a may be similar to core rod assembly 28a having a similar core rod 40a and optionally the same or different neck mold 42a and may be similarly cooled. Again, the cooling at the second parison layer injection molding station 14a of two layered parison 34c while on the third core rod assembly 38a will be for the duration of the initial injection molding cycle for the formation of the single parison layer at station 12.

Simultaneously with the molding of the first parison layer 34a at the first parison layer molding station 12, a second parison layer is injection molded at the second parison layer molding station 14b to form the two layered parison 34b. At this station, the two layered parison 34b is formed in the second parison layer injection mold 36b about core rod assembly 28b having core rod 30b and neck mold 32b.

A previously molded three layer parison 34e at the third parison layer injection molding station 16a will have been disassociated earlier from the third core rod assembly 38a at the third parison layer injection molding station 16a, three layered parison 34e will continue to be cooled in the third parison layer injection mold 44a while associated with fourth core rod assembly 46a on indexing platen 24 and which can also be cooled by fluid (water or oil). Core rod assembly 46a may be similar to core rod assembly 28a having a similar core rod 48a and optionally the same or different neck mold 50a and may be similarly cooled. Again, the cooling at the third parison layer injection molding station 16a of three layered parison 34e while on the fourth core rod assembly 46a will be for the duration of the initial injection molding cycle for the formation of the single parison layer at station 12.

Simultaneously with the molding of the first parison layer 34a at the first parison layer molding station 12, a third parison layer is injection molded at the third parison layer molding station 16b to form the three layered parison 34d. At this station, the three layered parison 34d is formed in the third parison layer injection mold 44d above core rod assembly 38b having core rod 40b and neck mold 42b.

A previously molded three layer parison 34g at cooling station 18a will have been disassociated from the fourth core rod assembly 46a and blown off the core rod 48a into intimate contact with the slightly enlarged cavity surfaces of cooling mold 52a at the beginning of the cooling cycle. At the cooling station 18a, the three layered parison 34g will continue to be cooled in the cooling mold 52a while associated with a pick off pin or transfer bushing 54a on indexing platen 24. Again, the cooling at the cooling station 18a of the three layered parison will be for the duration of the initial injection molding cycle for the formation of the single parison layer at station 12.

Alternatively, and as stated above, the cooling stations 18a, 18b may be orient-stretch blow molding stations for producing blown bottles instead of parisons for subsequent blowing. For further details of stations of this type, reference is made to U.S. patent application Ser. No. 08/309,103 filed Sep. 20, 1994.

Simultaneously with the molding of the first parison layer 34a at the initial parison layer molding station 12, a three layer parison 34f at the cooling station 8b is cooled about fourth core rod assembly 46a on indexing platen 24 for the duration of the initial injection molding cycle.

A previously cooled three layered parison 34h will have been disassociated from the transfer bushing 44b at the ejection station 20b.

Figure 2:
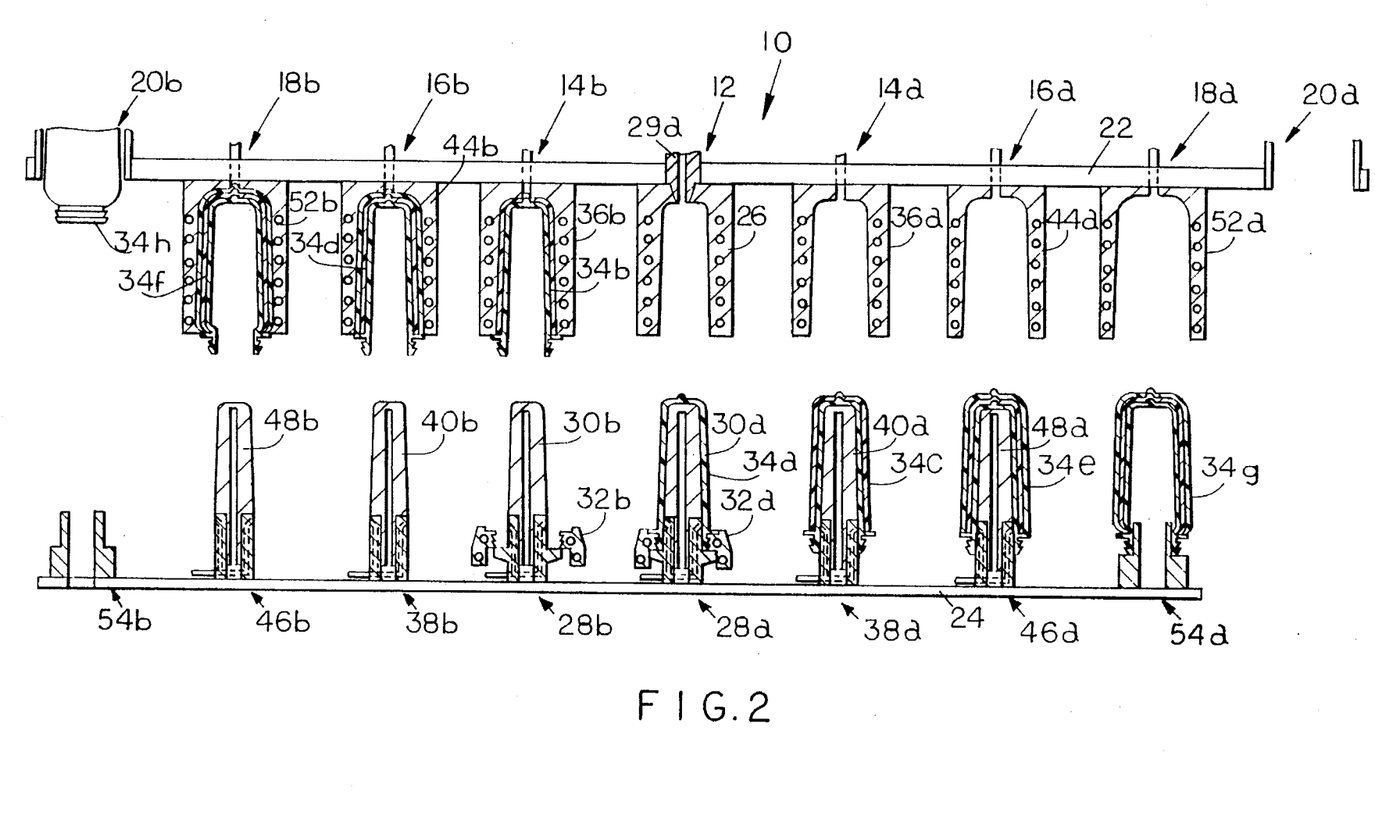
FIG. 2 is a similar top plan view of the press opened.

At the completion of the injection molding cycle, the indexing platen is retracted to the position shown in FIG. 2. As shown, the first parison layer 34a will be retracted with core rod assembly 28a and closed neck mold 32a. Prior to the retraction of platen 24, the neck mold 32b will have opened thereby permitting the open neck mold 32b and core rod assembly 28b to be retracted and leave remaining in mold 36b the two layered parison 34b. In this regard, the core rod assembly 28b may have air jets, ports or longitudinal channels or spaces that with a blast of air, will free the parison 34b from core rod 30b. Two layered parison 34c is removed from mold 36a and retracted with core rod assembly 38a. Three layered parison 34d will remain in mold 44b with core rod assembly 38b being retracted with indexing platen 24 following opening of neck mold 42b. Three layered parison 34e is removed from mold 44a and retracted with core rod assembly 46a. Three layered parison 34f will remain in cooling mold 56b after having been slightly expanded into intimate contact with slightly enlarged cavity of cooling mold 52b by air under pressure at the start of the initial injection molding cycle. Core rod assembly 46b will be retracted from the slightly expanded three layer parison 34f which will remain in cooling mold 52b upon the retraction of indexing platen 24. Three layered parison 34g will be removed from cooling mold 52a and retracted with transfer bushing 54a.

Figure 3:
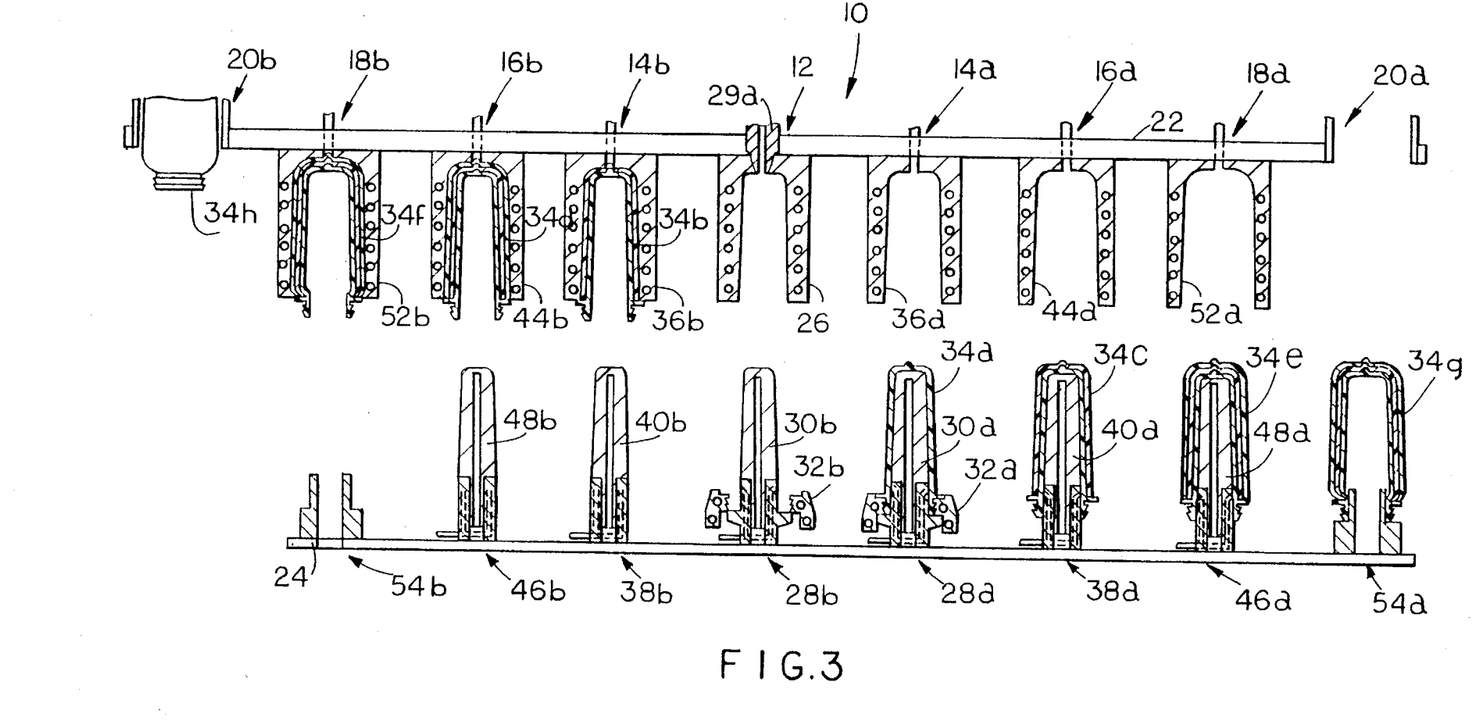
FIG. 3 is a similar top plan view with the press still open and linearly shifted and indexed to the right to transfer parisons to the next injection molding stations and a multi-layered parison to a cooling station and a cooled multilayered parison to an ejection station.

The platen 24 will then be shifted laterally to the right as shown in FIG. 3 so that the core rod assembly 28b and neck mold 32b will be axially aligned with the initial parison layer injection mold 26 at molding station 12; and the other rod assemblies and bushings will be aligned as shown. Even during this indexing step the various layered parison will be further cooled except for parison 34g on transfer bushing 54a.

Figure 4:
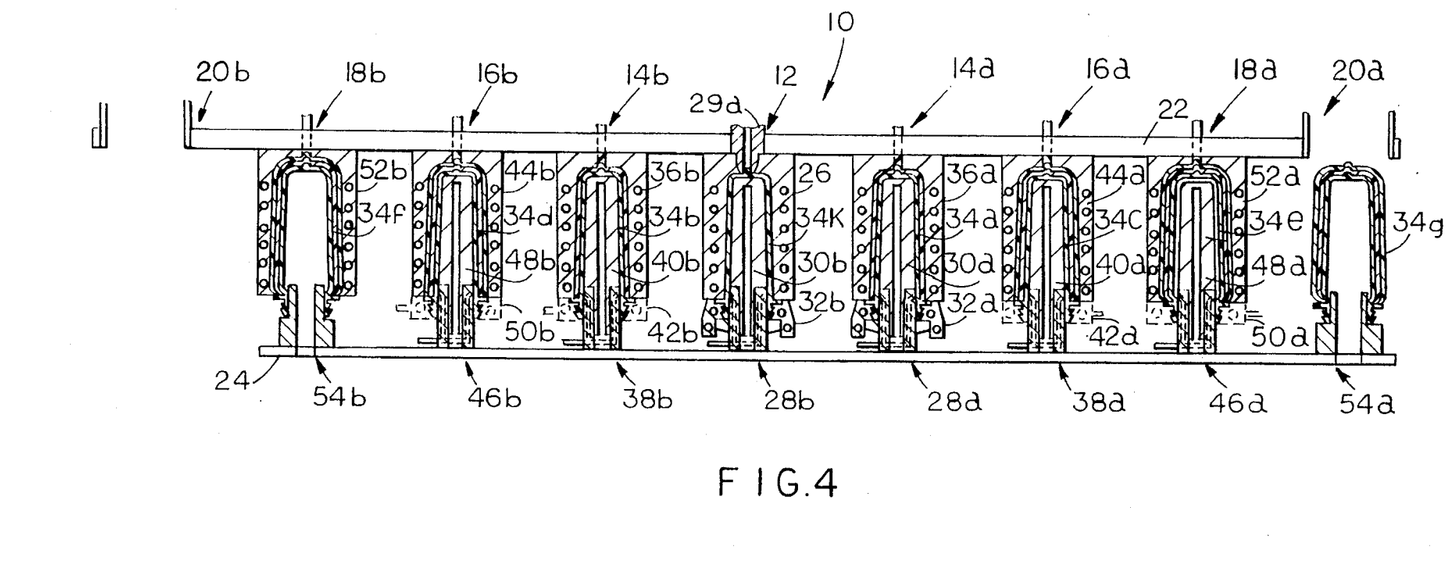
FIG. 4 is a similar plan view with the press closed.
Figure 5:
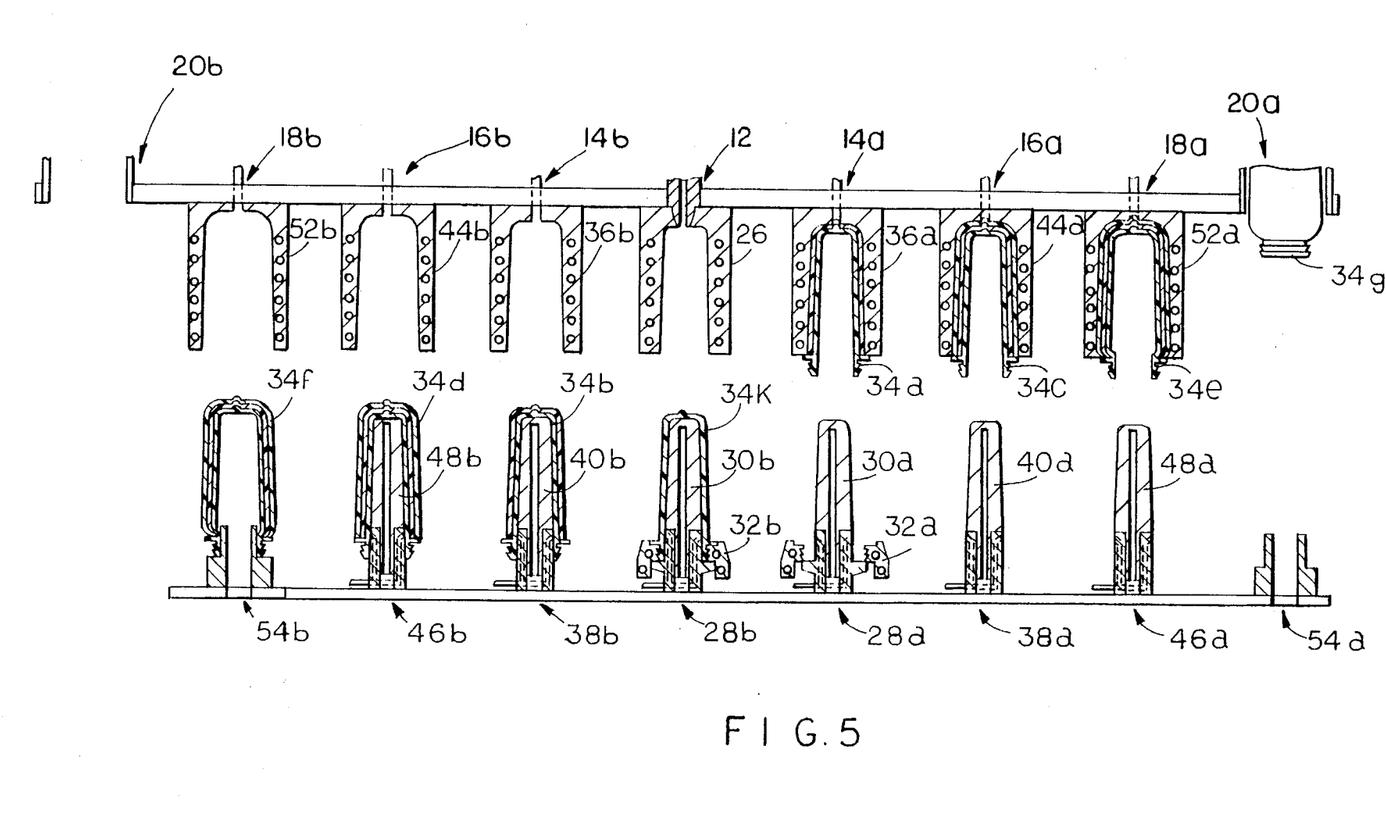
FIG. 5 is a similar plan view with the press opened.
Figure 6:
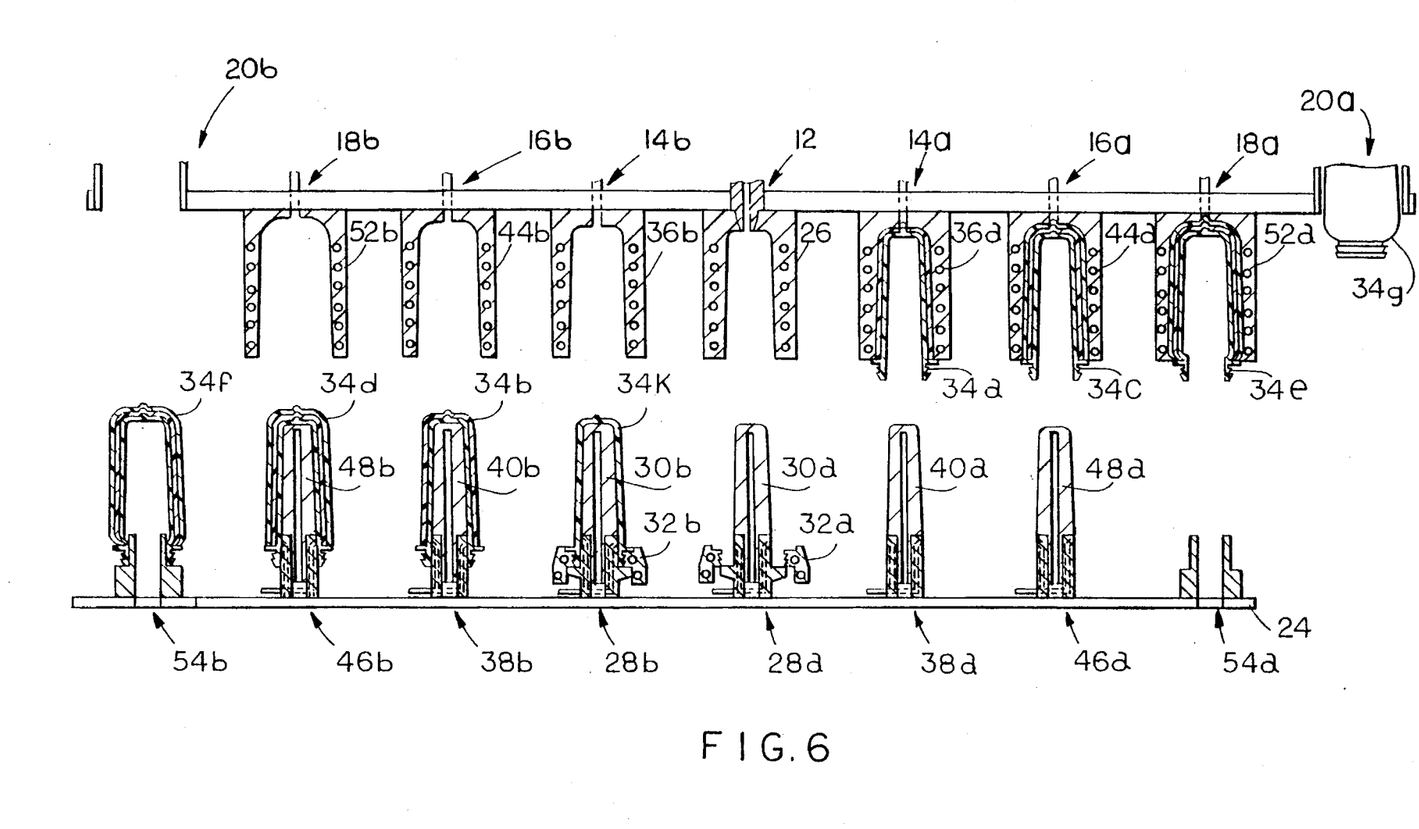
FIG. 6 is a similar plan view with the press still open and linearly shifted and indexed to the left.

The platen 24 is then reciprocated axially to place core rod assembly 28b with closed neck mold 32b in association with injection mold 26 at the initial injection molding station 12 as shown in FIG. 4. Parison 34a will be placed in second parison layer injection mold 36a at second parison layer injection molding station 14a while on core rod assembly 28a and closed neck mold 32a. Core rod assembly 38a will have placed two layered parison 34c in the third parison layer injection mold 44a at third parison layer injection molding station 16a. The core rod assembly 38b will be associated with the two layered parison 34b. Core rod assembly 46a will have placed three layered parison 34e in cooling mold 52a at cooling station 18a. Transfer bushing 54b will engage with the neck of the three layered parison 34f in cooling mold 52b. The cooled three layered parison 34g will then be removed from transfer bushing 54a at ejection station 20a. The next injection molding cycle will then begin as shown in FIG. 4. The molding and indexing cycles are repeated until the single parison layer 34a has three injected molded layers, is cooled and ejected at station 20a. In this regard, FIG. 5 shows the indexing platen 24 retracted and FIG. 6 shows the indexing platen 24 shifted to the left. Thereafter, the platen 24 is closed to commence the next injection molding cycle as shown in FIG. 1.

Although a single row of stations are illustrated in the drawings, it should be understood that multiple rows of such stations may be on the platens 22 and 24, not only in a horizontally disposed line as illustrated but vertical or in parallel lines; and similarly, the platens 22 and 24 could be horizontally disposed rather than being vertical as shown where desired or necessary.

Mechanism for accomplishing the axial reciprocation of platen 24 and the lateral reciprocation of platen 24 is of a well known type in the art and for this reason, will neither be discussed or illustrated.

As previously explained, the present invention contemplates forming multi-layered parison from two layers to as many layers desired. In any event, thin layer walls are formed so that they may be quickly cooled thereby holding to a minimum the injection molding cycles. Because the walls are thin they are capable of being cooled fast. The layers may be of the same resin or different resins. Barrier properties of one or more layers may be added to the parison and subsequent blown bottles. One or more layers may be virgin resin or recycled post consumer resin. The multiple resin injection technique of this invention may be part of a two stage injection blow molding process in which a multi-layered parison is formed at the first stage as disclosed in U.S. patent application Ser. No. 08/282,530 filed Jul. 28, 1994 and then subsequently blown at a second stage machine or a single stage injection blow or orient-stretch blow molding process in which a multi-layered parison is formed and blown in the same machine as disclosed in U.S. patent application Ser. No. 08/309,103 filed Sep. 20, 1994.

Thus, the several aforenoted objects and advantages are most effectively attained. Although several somewhat preferred embodiments have been disclosed and described in detail herein, it should be understood that this invention is in no sense limited thereby but its scope is to be determined by that of the appended claims.

I claim:

1. An apparatus for forming a parison having multiple resin layers comprising:

a first parison layer injection molding station for forming a first parison layer of reduced thickness;

a pair of second parison layer injection molding stations for forming a second parison layer of reduced thickness on a first parison layer with one of the second parison layer injection molding stations being on opposed sides of the first parison layer injection molding station;

indexing means for moving a first of the first parison layer from the first parison layer injection molding station to one of the second parison layer injection molding stations and a second of the first parison layer to the other of the second parison layer injection molding stations, the second of the first parison layer being injection molded at the first parison layer injection molding station while the first of the first parison layers is at the one of the second parison layer injection molding stations for receiving a second parison layer thereon to form a first two layered parison.

2. The invention in accordance with claim 1 wherein a pair of third parison layer injection molding stations are provided for forming a third parison layer of reduced thickness on a two layered parison with one of the third parison layer injection molding stations being on opposed sides of the first parison layer injection molding station with a second parison layer injection molding station being interposed between the first parison layer injection molding station and a third parison layer injection molding station;

the indexing means being operable to move the second of the first parison layer to the other of the second parison layer injection molding stations for receiving a second parison layer thereon to form a second two layered parison while the first two layered parison remains at the one of the second parison layer injection molding station and while a third of the first parison layer is injection molded at the first parison layer injection molding station;

the indexing means being operable to move the third of the first parison layer to the one of the second parison layer injection molding stations for receiving a second parison layer thereon to form a third two layered parison, the first two layered parison to the one of the third parison layer injection molding stations for receiving a third parison layer thereon to form a first three layered parison while the second two layered parison remains at the other of the second parison layer injection molding stations and while a fourth of the first parison layer is injection molded at the first parison layer molding station.

3. The invention in accordance with claim 2 wherein a pair of cooling stations are provided for cooling the three layered parison with one of the cooling stations being on opposed sides of the first parison layer injection molding station with a second and third parison layer injection molding station being interposed between the first parison layer injection molding station and a cooling station;

the indexing means being operable to move the fourth of the first parison layer to the other of the second parison layer injection molding station for receiving a second parison layer thereon to form a fourth two layered parison and the second two layered parison to the other of the third parison layer molding stations for receiving a third parison layer thereon to form a second three layered parison while the third two layered parison remains at the one of the second parison layer injection molding station and the first three layered parison remains at the one of the third parison injection molding station while a fifth of the first parison layer is injection molded at the first parison layer injection molding station;

the indexing means being operable to move the fifth of the first parison layer to the one of the second parison layer injection molding stations for receiving a second parison layer thereon to form a fifth two layered parison, the third two layered parison to the one of the third parison layer injection molding stations for receiving a third parison layer thereon to form a third three layered parison and the first three layered parison to the one of the cooling stations while a sixth of the first parison layer is injection molded at the first parison layer injection molding station.

4. The invention in accordance with claim 3 wherein a pair of ejection stations are provided for ejecting cooled three layered parisons with one of the ejection stations being on opposed sides of the first parison layer injection molding station with a second and third parison layer injection molding station and cooling station being interposed between the first parison layer injection molding station and an ejection station;

the indexing means being operable to move the sixth of the first parison layer to the other of the second parison layer injection molding station for receiving a second parison layer thereon to form a sixth two layered parison and the fourth two layered parison to the other of the third parison layer molding station for receiving a third parison layer thereon to form a fourth three layered parison and the second three layered parison to the one of the cooling station for further cooling while the fifth two layered parison remains at the one of the second parison layer injection molding station and the third three layered parison remains at the one of the third parison injection molding station and the first three layered parison remains at the one of the cooling station while a seventh of the first parison layer is injection molded at the first parison layer injection molding station;

the indexing means being operable to move the seventh of the first parison to the one of the second parison layer injection molding station for receiving a second parison layer thereon to form a seventh two layered parison, the fifth two layered parison to the one of the third parison layer injection molding station for receiving a third parison layer thereon to form a fifth three layered parison and the third three layer parison to the one of the cooling station and the first three layered cooled parison to the one of the ejection station while an eighth of the first parison layer is injection molded at the first parison injection molding station.

5. The invention in accordance with claim 4 wherein each of the injection molding stations have an injection mold and a core rod assembly with at least the core rod assembly at the first parison layer injection molding station including a neck mold for forming a neck on the parisons.

6. The invention in accordance with claim 5 wherein the injection mold, neck mold and core rod assembly having cooling means for cooling the parison layer and layered parisons.

7. The invention in accordance with claim 6 wherein each of the cooling stations having a cooling mold and a core rod assembly for receiving the three layered parison and for further cooling this parison.

8. The invention in accordance with claim 7 wherein the indexing means include a stationary platen mounting the injection molds and cooling molds and an indexing platen mounting the core rod assemblies and neck mold.

9. The invention in accordance with claim 8 wherein the indexing platen includes transfer bushings, the first transfer bushing being operable to move the cooled three layered parison from the cooling station to the ejection station.

10. The invention in accordance with claim 2 wherein a pair of orient-stretch blow molding stations are provided for blow molding the three layered parison with one of the orient-stretch blow molding stations being on opposed sides of the first parison layer injection molding station with a second and third parison layer injection molding station being interposed between the first parison layer injection molding station and a orient-stretch blow molding station;

the indexing means being operable to move the fourth of the first parison layer to the other of the second parison layer injection molding station for receiving a second parison layer thereon to form a fourth two layered parison and the second two layered parison to the other of the third parison layer molding stations for receiving a third parison layer thereon to form a second three layered parison while the third two layered parison remains at the one of the second parison layer injection molding station and the first three layered parison remains at the one of the third parison injection molding station while a fifth of the first parison layer is injection molded at the first parison layer injection molding station;

the indexing means being operable to move the fifth of the first parison layer to the one of the second parison layer injection molding stations for receiving a second parison layer thereon to form a fifth two layered parison, the third two layered parison to the one of the third parison layer injection molding stations for receiving a third parison layer thereon to form a third three layered parison and the first three layered parison to the one of the orient-stretch blow molding stations while a sixth of the first parison layer is injection molded at the first parison layer injection molding station.

11. The invention in accordance with claim 10 wherein a pair of ejection stations are provided for ejecting cooled three layered parisons with one of the ejection stations being on opposed sides of the first parison layer injection molding station with a second and third parison layer injection molding station and orient-stretch blow molding station being interposed between the first parison layer injection molding station and an ejection station;

the indexing means being operable to move the sixth of the first parison layer to the other of the second parison layer injection molding station for receiving a second parison layer thereon to form a sixth two layered parison and the fourth two layered parison to the other of the third parison layer molding station for receiving a third parison layer thereon to form a fourth three layered parison and the second three layered parison to the one of the orient-stretch blow molding station for further cooling while the fifth two layered parison remains at the one of the second parison layer injection molding station and the third three layered parison remains at the one of the third parison injection molding station and the first three layered parison remains at the one of the orient-stretch blow molding station while a seventh of the first parison layer is injection molded at the first parison layer injection molding station;

the indexing means being operable to move the seventh of the first parison to the one of the second parison layer injection molding station for receiving a second parison layer thereon to form a seventh two layered parison, the fifth two layered parison to the one of the third parison layer injection molding station for receiving a third parison layer thereon to form a fifth three layered parison and the third three layer parison to the one of the orient-stretch blow molding station and the first three layered cooled parison to the one of the ejection station while an eighth of the first parison layer is injection molded at the first parison injection molding station.

12. The invention in accordance with claim 11 wherein each of the injection molding stations have an injection mold and a core rod assembly with at least the core rod assembly at the first parison layer injection molding station including a neck mold for forming a neck on the parisons.

13. The invention in accordance with claim 12 wherein the injection mold, neck mold and core rod assembly having cooling means for cooling the parison layer and layered parisons.

14. The invention in accordance with claim 13 wherein each of the orient-stretch blow molding stations includes a blow mold for receiving the three layered parison, the blow mold having a cavity to provide a selected bottle configuration.

15. The invention in accordance with claim 14 wherein a transfer bushing is provided for moving the three layered parison from the third parison layer injection molding station to the neighboring orient-stretch blow molding station.

16. The invention in accordance with claim 15 wherein a blow rod assembly is provided with each transfer bushing, each blow rod assembly is axially reciprocal relative to the provided transfer bushing to stretch the three layered parison in the provided blow mold and then blow the stretched parison into the configuration of the blow mold.

17. The invention in accordance with claim 16 wherein the indexing means include a stationary platen mounting the injection molds and blow molds and an indexing platen mounting the core rod assemblies and neck mold and transfer bushings.

18. The invention in accordance with claim 17 wherein the indexing platen includes transfer bushings operable to move blown bottles from the blow molding station to the neighboring ejection station.

19. The invention in accordance with claim 2 wherein the parison layers are of the same resin.

20. The invention in accordance with claim 2 wherein the parison layers are of different resin.

21. The invention in accordance with claim 1 wherein the parison layers are of the same resin.

22. The invention in accordance with claim 1 wherein at least two of the parison layers are of different resins.

23. The invention in accordance with claim 22 wherein each of the parison layers are of a different resin.

24. The invention in accordance with claim 1 wherein a pair of cooling stations are provided for cooling the two layered parison with one of the cooling stations being on opposed sides of the first parison layer injection molding station with a second parison layer injection molding station being interposed between the first parison layer injection molding station and a cooling station;

the indexing means being operable to move the second of the first parison layer to the other of the second parison layer injection molding station for receiving a second parison layer thereon to form a second two layered parison while the first two layered parison remains at the one of the second parison layer injection molding stations while a third of the first parison layer is injection molded at the first parison layer injection molding station;

the indexing means being operable to move the third of the first parison layer to the one of the second parison layer injection molding station for receiving a second parison layer thereon to form a third two layered parison, the first two layered parison to the one of the cooling station while a fourth of the first parison layer is injection molded at the first parison layer injection molding station.

25. The invention in accordance with claim 24 wherein a pair of ejection stations are provided for ejecting cooled two layered parisons with one of the ejection stations being on opposed sides of the first parison layer injection molding station with a second parison layer injection molding station and cooling station being interposed between the first parison layer injection molding station and an ejection station;

the indexing means being operable to move the fourth of the first parison layer to the other of the second parison layer injection molding station for receiving a second parison layer thereon to form a fourth two layered parison and the second two layered parison to the other of the cooling station while the third two layered parison remains at the one of the second parison layer injection molding station while a fifth of the first parison layer is injection molded at the first parison layer injection molding station;

the indexing means being operable to move the fifth of the first parison to the one of the second parison layer injection molding stations for receiving a second parison layer thereon to form a fifth two layered parison, the third two layered parison to the one of the cooling station and the first two layered cooled parison to the one of the ejection stations while a sixth of the first parison layer is injection molded at the first parison injection molding station.

26. The invention in accordance with claim 1 wherein a pair of orient-stretch blow molding stations are provided for blow molding the two layered parison with one of the orient-stretch blow molding stations being on opposed sides of the first parison layer injection molding station with a second parison layer injection molding station being interposed between the first parison layer injection molding station and a orient-stretch blow molding station;

the indexing means being operable to move the second of the first parison layer to the other of the second parison layer injection molding station for receiving a second parison layer thereon to form a second two layered parison while the first two layered parison remains at the one of the second parison layer injection molding station while a third of the first parison layer is injection molded at the first parison layer injection molding station;

the indexing means being operable to move the third of the first parison layer to the one of the second parison layer injection molding stations for receiving a second parison layer thereon to form a third two layered parison, the first two layered parison to the one of the orient-stretch blow molding stations while a fourth of the first parison layer is injection molded at the first parison layer is injection molded at the first parison layer injection molding station.

27. The invention in accordance with claim 1 wherein a pair of blow molding stations are provided for blow molding the two layered parison with one of the blow molding stations being on opposed sides of the first parison layer injection molding station with a second parison layer injection molding station being interposed between the first parison layer injection molding station and a blow molding station;

the indexing means being operable to move the second of the first parison layer to the other of the second parison layer injection molding station for receiving a second parison layer thereon to form a second two layered parison while the first two layered parison remains at the one of the second parison layer injection molding stations while a third of the first parison layer is injection molded at the first parison layer injection molding station;

the indexing means being operable to move the third of the first parison layer to the one of the second parison layer injection molding stations for receiving a second parison layer thereon to form a third two layered parison, the first two layered parison to the one of the blow molding stations while a fourth of the first parison layer is injection molded at the first parison layer is injection molded at the first parison layer injection molding station;

a pair of ejection stations are provided for ejecting blown bottles with one of the ejection stations being on opposed sides of the first parison layer injection molding station with a second parison layer injection molding station and blow molding station being interposed between the first parison layer injection molding station and an ejection station;

the indexing means being operable to move the fourth of the first parison layer to the other of the second parison layer injection molding station for receiving a second parison layer thereon to form a fourth two layered parison and the second two layered parison to the other of the blow molding station while the third two layered parison remains at the one of the second parison layer injection molding station while a fifth of the first parison layer is injection molded at the first parison layer injection molding station;

the indexing means being operable to move the fifth of the first parison to the one of the second parison layer injection molding stations for receiving a second parison layer thereon to form a fifth two layered parison, the third two layered parison to the one of the blow molding station and the first two layered cooled parison to the one of the ejection stations while a sixth of the first parison layer is injection molded at the first parison injection molding station.

* * * * *